Figures 1, 2:
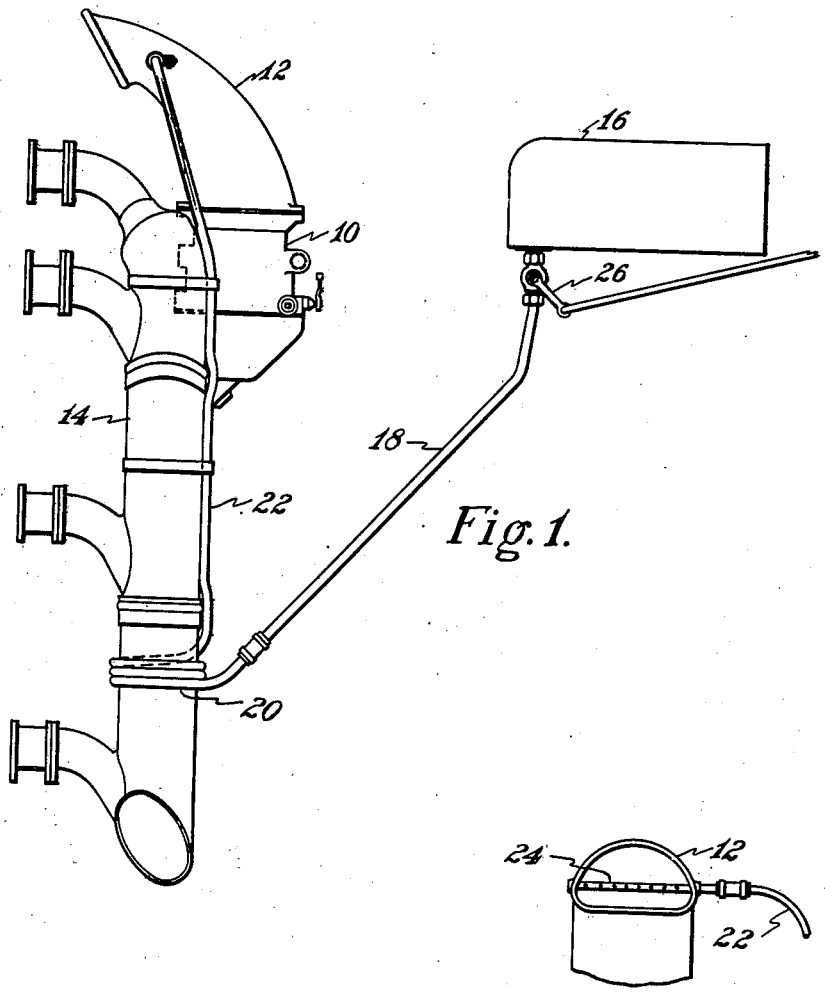

Jan. 12, 1937.  K. A. BROWNE ET AL  2,067,595
DEICING MEANS
Filed Aug. 14, 1934

INVENTORS
Kenneth A. Browne, Willard B. Goodman & Donald J. Lowman.
BY
ATTORNEY

Patented Jan. 12, 1937

2,067,595

UNITED STATES PATENT OFFICE 2,067,595

DEICING MEANS

Kenneth A. Browne, Concord, Mass., and Willard B. Goodman, Paterson, and Donald J. Lowman, Clifton, N. J., assignors, by mesne assignments, to The Reed Propeller Co., Inc., Garden City, N. Y., a corporation of New York Application August 14, 1934, Serial No. 739,808

1 Claim. (Cl. 123—127)

This invention comprises new and improved means for preventing and removing ice formations and in the specific embodiments of the drawing the device is shown as applied to an aircraft engine carburetor.

Due to the very large temperature drop that occurs in the carburetor where the fuel is evaporated, the mixture is often brought below freezing point even though the atmospheric temperature may be as much as 50° above freezing. The moisture contained in the air then freezes out and deposits in the carburetor, especially on the throttles. This restricts the mixture supply, causing a serious loss of power and often renders the throttles inoperative.

The traditional method of dealing with this difficulty has been to pre-heat the air, but the mass of air flow into a large aircraft engine is so great as to require very bulky heaters and the resulting temperature increase of the charge is itself a disadvantage.

According to the present invention alcohol is sprayed into the carburetor inlet, the initial intention being that the alcohol would mix with the water vapor contained in the air and produce a non-freezing mixture. Actual experiments with this device have shown that a small quantity of alcohol continuously injected has this effect and will prevent the formation of ice. Further, and more important than this, actual tests have shown that if the alcohol spray be turned on after the carburetor has become seriously iced up, the ice is completely removed in a few seconds. From tests made on special apparatus where the specimens to be iced up were in the open and subject to observation, it is concluded that this action results in the solvability of ice in alcohol, and it found that, in the presence of a high velocity air stream, an alcohol spray has the effect of loosening the ice from the object to which it was previously attached.

A number of alternative methods of introducing the alcohol have been tried and the preferred embodiment of the drawing shows a scheme wherein the alcohol is first evaporated, although it has been found to be quite effective to spray the alcohol in through a jet without previous evaporation.

In the drawing:

Fig. 1 is a diagram showing the exhaust pipe and carburetor of an engine equipped with the provisions of this invention; and Fig. 2 is a detailed front view of the air scoop entrance.

In these figures, 10 designates a conventional carburetor and 12 an intake air scoop, while 14 designates an engine exhaust pipe. A tank 16 for holding alcohol is placed as high as convenient and from this tank a pipe 18 having coils 20 surrounding a low point on the exhaust manifold is continued at 22 up the outside of the manifold and connects to the jet tube 24 in the air scoop entrance. A suitable pilot's control valve 26 is provided.

The operation of the device is as follows: When the pilot observes a loss of engine power which he suspects to be due to ice in the carburetor, he opens the valve 26 and the alcohol flows by gravity into the coil 20 where it is evaporated, the vapor issuing from the jet 24. The loosening of the ice from all the internal carburetor surfaces promptly follows and the engine regains its normal power after one or two seconds erratic running, as the detached ice particles pass to the cylinders. As soon as the engine regains its normal operation the pilot may shut off the valve 26. In general, it requires many minutes to build up sufficient ice to seriously detract from the engine power, while the spray device of this invention is effective to remove such a quantity of ice in a few seconds. Accordingly, it is only necessary to turn on the alcohol for a few seconds at a time when required, but a continued slow rate of feed will be effective in keeping any ice formation from starting.

It will be obvious that a great variety of means may be used to control the introduction of the alcohol. The preferred embodiment of the showing, however, has certain advantages, including the following: The jets may be above the tank level whereby no alcohol will flow unless the leg leading from the coil to the jet contains vapor and not liquid. This can only occur when the engine is operating, since it requires heat from the exhaust manifold to produce the evaporation. Thus, if the control valve should be accidentally left on when the engine is not running, no alcohol will be lost and fire hazard is avoided. By suitable selection of the jet size in relation to the head between the tank and the coil, any desired rate of flow may be obtained without resource to metering pumps, etc. However, the use of pumps, if desirable in certain cases, is intended to be within the scope of this invention.

While we have described our invention in detail in its present preferred embodiment, it will be obvious to those skilled in the art, after understanding our invention, that various changes and modifications may be made therein without departing from the spirit or scope thereof. We aim in the appended claim to cover all such modifications and changes.

What is claimed is:

The combination with an engine carburetor having an intake air scoop at the upstream side thereof and an engine exhaust manifold, of a jet at the air intake of said scoop, upstream from said carburetor, an anti-freeze fluid supply tank above said manifold, and a conduit running from said tank to said jet said conduit in part being in heat exchanging relation with said exhaust manifold.

KENNETH A. BROWNE.
WILLARD B. GOODMAN.
DONALD J. LOWMAN.